C. A. WYMAN.
PORTABLE POULTRY COOP.
APPLICATION FILED JAN. 2, 1912.
1,054,071.
Patented Feb. 25, 1913.
4 SHEETS—SHEET 2.
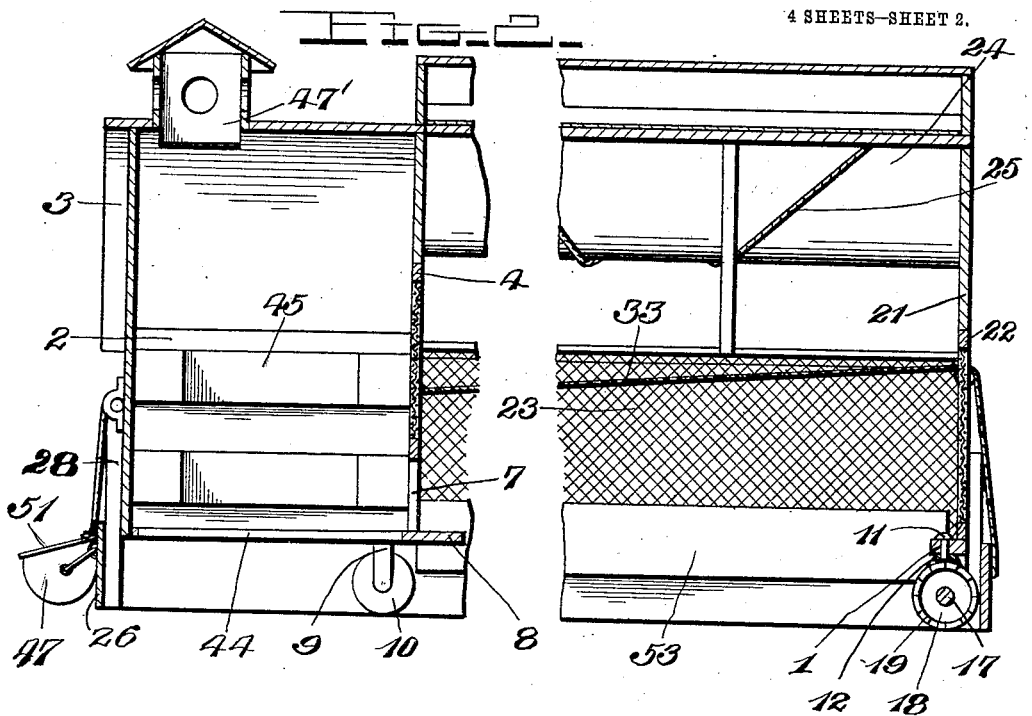
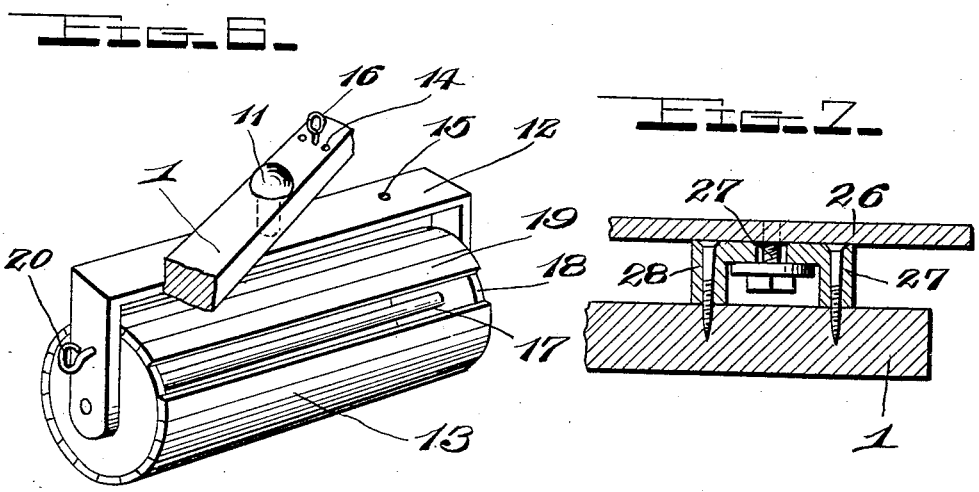
Witnesses
Chas. L. Griestauer
A. B. Norton
Inventor
C. A. Wyman
By Watson E. Coleman
Attorney

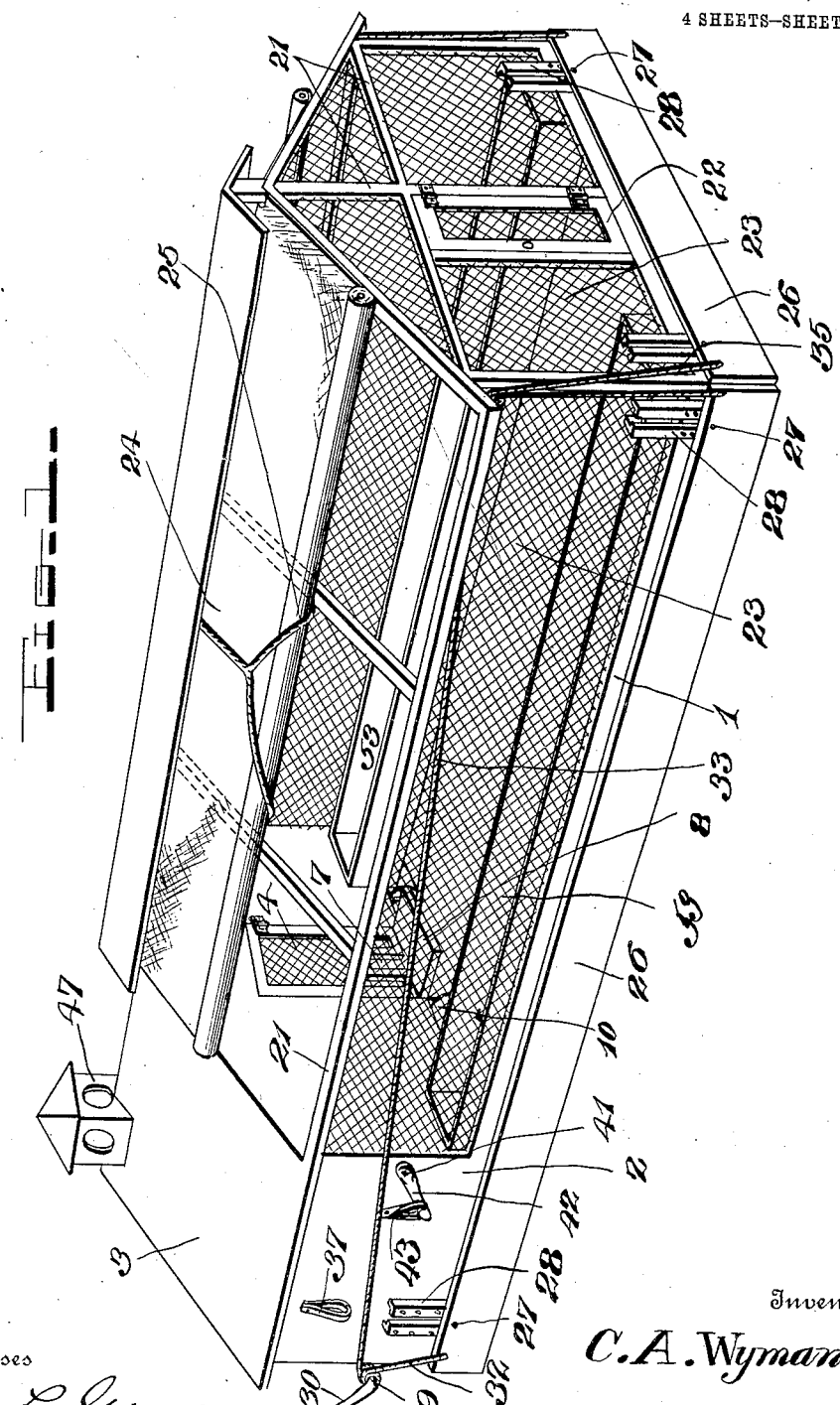

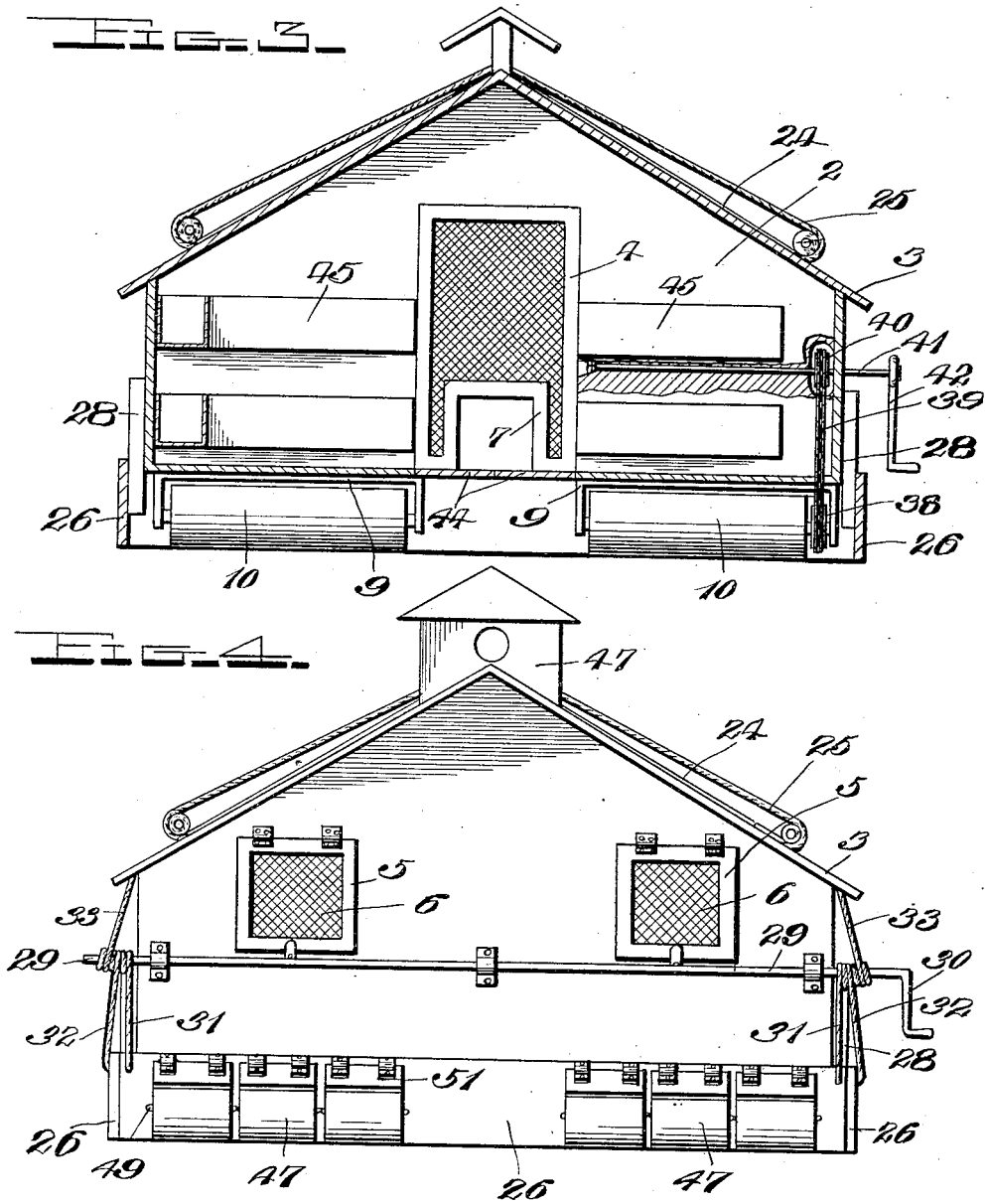

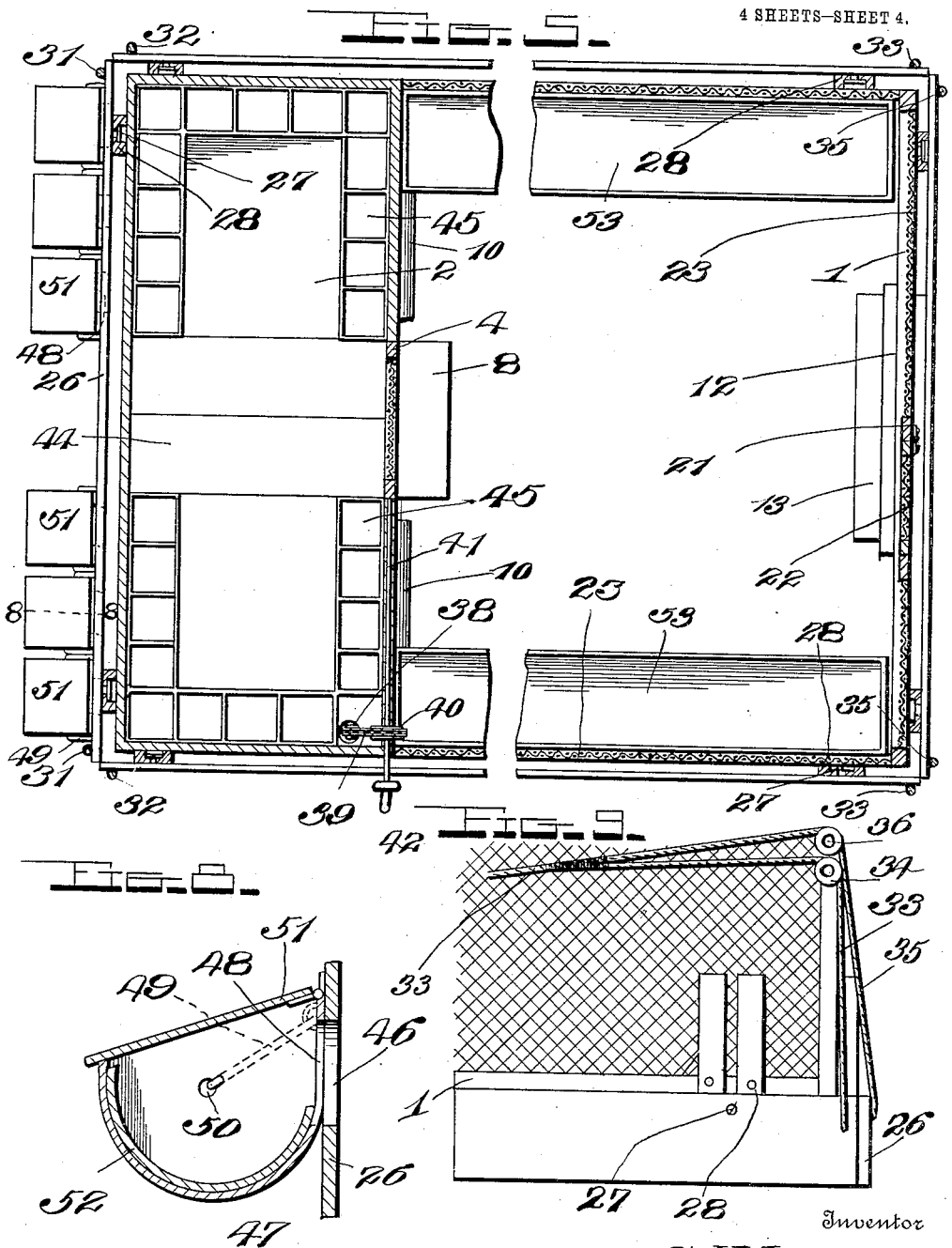

UNITED STATES PATENT OFFICE.

CHARLES A. WYMAN, OF GASTON, OREGON.

PORTABLE POULTRY-COOP.

1,054,071.  Specification of Letters Patent.  Patented Feb. 25, 1913.

Application filed January 2, 1912. Serial No. 668,852.

*To all whom it may concern:*

Be it known that I, CHARLES A. WYMAN, a citizen of the United States, residing at Gaston, in the county of Washington and State of Oregon, have invented certain new and useful Improvements in Portable Poultry-Coops, of which the following is a specification, reference being had to the accompanying drawings.

My invention relates to new and useful improvements in portable poultry coops and more particularly to a combined poultry house and yard, and my object is to provide a device of this character which will protect the poultry during all seasons of the year, the same being designed to afford ample warmth and protection during the cold seasons and secure the necessary ventilation during the warm seasons of the year, thereby maintaining the inclosed poultry in a healthy condition.

A further object of the invention resides in providing a device which may be readily moved from place to place, and a still further object resides in providing means for manually propelling the device.

Still another object of the invention resides in providing movable side boards for the device which are adapted to be raised when the device is moved and which are lowered when the device is properly positioned, and another object resides in providing means for manually raising and lowering all the side boards simultaneously.

A still further object of the invention resides in providing a device which is simple, light and durable in construction, inexpensive to manufacture, and one which is very efficient and useful in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a perspective view of the device set up for operation. Fig. 2 is a fragmentary vertical section therethrough. Fig. 3 is a transverse section through the housing portion of the device. Fig. 4 is a rear elevation of the same. Fig. 5 is a horizontal section therethrough. Fig. 6 is a perspective view of the front roller and the frame carrying the same. Fig. 7 is a section through a pair of the clutch members showing the manner of securing the side board thereto. Fig. 8 is a section through one of the nest boxes as seen on line 8—8, Fig. 5, and, Fig. 9 is a fragmentary side elevation of the forward portion of the yard structure showing the manner in which the side, forward and end boards are capable of being raised.

In carrying out my invention, I shall refer to the drawings in which similar reference characters designate corresponding parts throughout the several views and in which—

1 indicates a bed or main frame of substantially rectangular design and of any desired size, whatsoever, upon one end of which is built a housing 2, the roof 3 of said housing comprising two inclined divergent faces, the side edges of which overhang the side walls of said housing, as do the eaves of an ordinary building or house structure. This housing may be of any desired size proportionate to the size of the base frame 1, and the front wall of said housing is provided with a hinged entrance and exit door 4, while the rear wall of the housing is provided with a plurality of hinged ventilating windows or the like 5, the openings over which said windows are disposed being covered by any desired form of wire netting or the like 6. This door 4 in the housing is in itself provided with an additional or smaller door 7 adjacent the lower end thereof, while the lower end of said door 4 is provided with a laterally extending step or the like 8, the purpose of which will be hereinafter and more particularly described.

The under face of the flooring of the housing 2 is provided at its forward end with frame-works or the like 9 which form bearings for the rollers 10, which rollers support the housing portion of the device above the surface of the ground and permit the same to be rolled from place to place, and the forward end of the frame 1 has pivoted thereto, through the medium of a king bolt 11, an additional frame-work 12 which has revolubly mounted therein, the additional roller 13. From this construction, it will be seen that the complete frame with all its adjunctive parts may be readily rolled from place to place, the front roller being capable of disposition to one side or the other, in view of the pivotal mounting of the frame thereof, and in order to retain said frame and roller in any desired position, the frame 1 is provided with a plurality of openings 14, while the upper face of the frame 12 is likewise provided with a single registering opening 15, which registering opening is adapted to be held in registration with any one of the plurality of openings 14 by means of a pin or the like 16. When held in certain positions determined by the registration of the opening 15 with certain of the openings 14, it will be seen that the roller will be disposed in alinement with the forward portion of the frame 1 which will allow the device to be propelled straight forwardly or the same may be disposed to one side or the other to permit the device to be guided in that particular direction. These rollers are of particularly light and simple construction, the same comprising merely a central shaft 17 upon which are mounted a pair of circular heads or the like 18 and a plurality of slats or strips 19 connecting the heads 18 and forming a hollow cylindrical member. These rollers may be of any size desired, depending entirely upon the space that is desired between the surface of the ground and the flooring of the housing. The frame 12 is provided with the hooks or the like 20 on the sides thereof, with which may be engaged a tongue or any other means (not shown), whereby the front roller may be guided in any desired position as the device is drawn from place to place.

Mounted on the frame 1, covering that portion of the latter which is not taken up by the housing 2, is an additional framework 21 which is designed to form a substantial continuation of the housing 2, said frame 21 being substantially of the same contour as the latter. A hinged door 22 is formed in the front wall of the frame-work, and said door, front wall and side walls of said frame-work 21 are covered by a wire netting or the like 23 which will form a device which is capable of inclosing poultry and at the same time permit perfect ventilation. In order to form a top or cover for the frame-work 1, the canvas covers or awnings 24 are provided, which are secured at one end to the central longitudinal beam of the upper portion of said frame 21 and which may be rolled to their ineffective positions by means of the ropes or cables 25. It will be seen that during clear and warm days, these covers or awnings 24 may be drawn to their ineffective positions to permit the sunlight and air to enter within the inclosure formed by the frame-work 21, but during stormy or colder periods of the year, said covers or awnings may be lowered to form a protection for the fowl within the inclosure.

It will be seen that in the positioning of the rollers 10 and 13, the base or bed frame 1 will be positioned some distance above the surface of the ground, depending entirely upon the diameter of the rollers, and in order to provide a covering for the space left between the frame and the surface of the ground, I have provided the movable side and end boards 26. Each of these side and end boards is provided with a pair of bolts or the like 27 which receive therethrough, slotted members 28 carried by the frame 1, said bolts or the like 28 having heads thereon which retain the side boards to the frame, but which permit vertical movement of said side boards with respect thereto. It will, of course, be appreciated that when the device is not being moved from place to place, it is not only desirable but essential that the side boards 26 be in their lowered position, but when moving the device, it will be advantageous to have these boards raised some distance above the ground, and in order to provide means for such raising, I have provided on the rear wall of the housing 2, a shaft 29. This shaft is rotatably mounted on said housing having a crank or handle 30 formed on one end thereof for manual rotation of the same and cables 31 having one of their ends engaged with said shaft and the opposite ends thereof engaged with the movable end boards on the rear of the device, while cables 32 and 33 extend from said shaft and have their opposite ends engaged with the movable side boards of the device. The one cable 33 which is extended to the forward end of the side boards, extends over a pulley 34, and an additional cable 35 extending over an additional pulley 36, has one end thereof engaged with the cable 33, while the opposite end thereof is engaged with the movable end board which is mounted on the forward end of the frame 1. From this construction, it will be seen that as the crank or handle 30 is turned, the shaft 29 will be rotated to wind the cables 31, 32, 33 and 35 thereon and correspondingly raise the side and end boards to permit the device to be propelled from place to place, and in order to retain said boards in their raised positions while the device is being propelled, I provide a retaining member 37 which is pivotally mounted on the one side wall of the housing and is adapted to be engaged with the handle member 30.

I have also provided means whereby the device may be propelled manually, and to this extent, I provide one of the rollers 10 with a sprocket 38, over which extends a chain 39, said chain also engaging a sprocket 40 carried on a shaft 41 which is rotatably mounted transversely of the forward portion of the housing 2 on one side of the door 4 and above said roller. This shaft 41 extends beyond the one side wall of the housing 2 and has formed thereon, a crank or handle 42 by which the same may be readily rotated, and it will be appreciated that when rotated in one direction, the device will be propelled forwardly, and when rotated in the opposite direction, the device will be propelled rearwardly. A hook member or the like 43 is also pivotally mounted on this last referred to side wall of the housing 2 which is adapted to be engaged with the crank or handle 42 whereby it will be appreciated that the device cannot be propelled when so engaged, and thus said member 43 forms a substantial brake for the device.

The flooring of the housing 2 may be formed in any desired manner and the central portion thereof is provided with a pair of removable boards 44, and mounted on the walls within the housing 2 and above the flooring thereof, are the inner nests 45. These removable boards 44 in the flooring of the housing will permit the care taker of the device to readily enter within the same for the purpose of cleaning said housing, and it might be here stated that I have provided a plurality of outer nests on the device which may be readily handled for cleaning by the care taker.

The rear end board 26 is provided with a plurality of openings 46 which are arranged in series, and to this end board, are adapted to be removably secured, the nest boxes 47, said nest boxes being each provided with an opening 48 in the rear wall thereof adapted to aline with the opening 46 in the end wall. These nest boxes are removably held in position by hook members 49 carried on the end board, which are adapted to engage openings 50 in the sides of the nest boxes, and a plurality of plates or boards 51 hinged over the openings 46 on said board 26, are adapted to form covers for the nest boxes.

From this construction, it will be seen that the chickens and other poultry within the structure may readily pass beneath the flooring of the housing, and when desired to do so, may enter the next boxes 47 through the openings 46 in the end board and the openings 48 in the nest boxes. It will be seen, however, that when it is desired to remove these nest boxes, either any number of the same or the entire number, it will only be necessary for the care taker to disengage the hook members 49 therefrom, whereupon the nest boxes will be entirely disengaged from the end board, and it will further be seen that as soon as the nest boxes are removed, the plates or boards 51 which are hinged over the openings 46 to the end board 26, will drop to their lowered position over said openings 46 to entirely cover the same. Although not shown, it will be understood that if desired, some means may be provided for holding the boards 51 in their positions, as shown in Fig. 8, or in their lowered positions over the openings 46, so that the fowl will not be able to escape either from the nest boxes or from the inclosure beneath the flooring of the housing, and each of the nest boxes 47 is provided on its flooring with a covering of paper or the like 52 which will collect all dirt therein and which may be readily removed by the care taker when the nest boxes are removed from the end board. This construction, as described, will enable the care taker to readily clean the device with little or no trouble, whatsoever. It will also be understood that the inclosure beneath the flooring of the housing may be ventilated by merely removing the nest boxes and allowing the boards or plates 51 to remain in their raised positions, so that air may readily pass through the openings 46 in the end board, while the windows 5 in the rear wall of housing will permit of ventilation and fresh air being allowed to enter the housing 2. In this connection, for the ventilation of the housing 2, is also provided a particular ventilator 47' in the roof 3 of said housing in addition to the doors 4 and 7 in the front wall of the housing which may also be opened for the purpose of ventilation, when desired. From these various ventilating devices, it will be seen that a perfectly sanitary device so far as ventilation is concerned, has been provided. While I have not shown the same, it will be understood that the awning or cover 24 may be permitted to roll over the sides of the frame 21 so as to form a protection at these points in case of bad weather, or any other covering for the walls of the yard structure may be provided, if desired, but in any instance, it will be seen that I have provided a device which will afford perfect protection for the poultry in both warm and cold seasons of the year and which is provided with such means as to retain the same sanitary in all respects.

It must be here stated that the lower portion of the frame-work 21, along that portion forming the side walls of the structure of the device, are provided with troughs or bins 53, within which may be placed dirt, straw and the like and which may form scratching bins for the poultry. These bins or troughs extend the full length of the yard structure, the lower portions thereof being raised a distance above the ground so that the same will not contact with obstructions made in the path of the device as the same is propelled, and the same, in addition to forming scratching bins for the poultry, may also form out-door nests therefor.

From the foregoing, it will be seen that I have provided a simple, durable, inexpensive and efficient means for carrying out the objects of this invention, and while I have particularly described the elements best adapted to perform the functions set forth, it is obvious that various changes in form, proportion and in the minor details of construction may be resorted to without departing from the spirit or sacrificing any of the principles of the invention.

What I claim is:—

1. A device of the class described, comprising a base frame, a housing formed on one end thereof, a skeleton frame-work formed on the remaining portion of said base frame, a covering for said frame-work, a plurality of rollers carried by said base frame to movably support the same above the surface of the ground, a plurality of boards depending from the side and end edges of said base frame and vertically movable thereon, and means to raise and lower said boards with respect to said base frame.

2. A device of the class described, comprising a base frame, a housing formed on one end thereof, a skeleton frame-work formed on the remaining portion of said base frame, a covering for said frame-work, a plurality of rollers carried by the base frame to movably support the same above the surface of the ground, a plurality of boards adjustably suspended from the side and end edges of said base frame, and means to simultaneously raise and lower said boards.

3. A device of the class described, comprising a base frame, a housing formed on one end thereof, a skeleton frame-work formed on the remaining portion of said base frame, a covering for said frame-work, a plurality of rollers carried by said base frame to movably support the same above the surface of the ground, a plurality of boards depending from the side and end edges of said base frame, means to raise and lower said boards with respect to said base frame, and means in connection with one of said rollers for the manual propulsion of said base frame and parts carried thereby.

4. A device of the class described, comprising a base frame, a housing formed on one end thereof, a skeleton frame-work formed on the remaining portion of said base frame, a covering for said frame-work, a plurality of rollers carried by the base frame to movably support the same above the surface of the ground, a plurality of boards adjustably suspended from the side and end edges of said base frame, means to simultaneously raise and lower said boards, and means coöperating with one of said rollers to manually propel the base frame and parts carried thereby.

5. A device of the class described, comprising a base frame, a housing formed on one end thereof, a skeleton frame-work formed on the remaining portion of the frame, a covering for said frame-work, means to movably support said frame-work above the surface of the ground, a plurality of boards provided with slotted cleats, means carried on the side and end edges of said base frame engaging the slots in said cleats to suspend the boards therefrom, and means carried on said housing and having connection with each of said boards for manually raising and lowering the latter on the base frame.

6. A device of the class described, comprising a base frame, a housing formed on one end thereof, a skeleton frame-work formed on the remaining portion of said base frame, a covering for the frame-work, means to movably support said base frame above the surface of the ground, a plurality of boards adjustably secured to the side and end edges of said base frame, a shaft rotatably mounted on said housing and having connection with each of said boards, and means to rotate said shaft, whereby said boards will be simultaneously raised and lowered.

7. A device of the class described, comprising a base frame, a housing formed on one end thereof, a skeleton frame-work formed on the remaining portion of said base frame, a covering for said frame-work, means to movably support said base frame above the surface of the ground, a plurality of boards adjustably suspended from the side and end edges of said base frame, said boards being movable vertically of the base frame, a shaft rotatably mounted on said housing, a flexible connecting means between said shaft and each of said boards, and means for the manual rotation of said shaft, whereby said boards will be simultaneously raised and lowered.

8. A device for raising and housing poultry, comprising a base frame, a housing formed on one end thereof, a skeleton frame-work formed on the remaining portion of said base frame, a covering for the latter frame-work, means to movably support said base frame above the surface of the ground, movable dependent side and end boards for said base frame, the end board contiguous with said housing being provided with a plurality of openings therein, a plurality of nest boxes adapted to be applied to the last referred to end board, said nest boxes being each provided with an opening therein adapted for alinement with the openings in the end board, and means to removably mount said nest boxes in position on said end board.

In testimony whereof I hereunto affix my signature in the presence of two witnesses.

CHARLES A. WYMAN.

Witnesses:
L. L. PAGET,
ALTA PURDY.